United States Patent
Lekutai (10) Patent No.: US 12,324,008 B2
(45) Date of Patent: *Jun. 3, 2025

(54) SELECTION OF OPEN RADIO ACCESS NETWORK (RAN) COMPONENTS

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,697

(22) Filed: Nov. 15, 2022

(65) Prior Publication Data

US 2023/0069921 A1     Mar. 9, 2023

Related U.S. Application Data

(63) Continuation of application No. 17/143,990, filed on Jan. 7, 2021, now Pat. No. 11,510,208.

(51) Int. Cl.
| | |
|---|---|
| *H04W 72/51* | (2023.01) |
| *H04W 24/02* | (2009.01) |
| *H04W 72/52* | (2023.01) |

(52) U.S. Cl.
CPC .......... *H04W 72/51* (2023.01); *H04W 72/52* (2023.01); *H04W 24/02* (2013.01)

(58) Field of Classification Search
CPC ... H04W 76/15; H04W 88/085; H04W 75/15; H04W 28/0925; H04W 28/0265;

(Continued)

(56) References Cited

U.S. PATENT DOCUMENTS

| 10,432,542 B2 | 10/2019 | Cosimini et al. |
| 10,530,645 B2 | 1/2020 | Yang et al. |

(Continued)

FOREIGN PATENT DOCUMENTS

| EP | 4007350 A1 * | 6/2022 | ......... H04L 41/0866 |
| WO | WO2021003283 | 1/2021 | |
| WO | WO2021158347 | 8/2021 | |

OTHER PUBLICATIONS

M. Polese, L. Bonati, S. D'Oro, S. Basagni and T. Melodia, "Understanding O-RAN: Architecture, Interfaces, Algorithms, Security, and Research Challenges," in IEEE Communications Surveys & Tutorials, doi: 10.1109/COMST.2023.3239220. (Year: 2023).*

(Continued)

*Primary Examiner* — William D Cumming
(74) *Attorney, Agent, or Firm* — Lee & Hayes, P.C.

(57) ABSTRACT

A telecommunication network associated with a wireless telecommunication provider can be configured to select RAN components for use by a UE in an open RAN. Hardware/software of a telecommunication network automatically selects one or more RUs, DUs, and CUs (which may come from different vendors) to use for a communication session with a UE. In some configurations, an application on the UE specifies the desired performance (e.g., bandwidth requirements, processing requirements, latency requirements, . . . ). For example, if an application requests a large throughput of data, a Massive MIMO RU can be selected for use, whereas if a moderate throughput is specified, then a traditional 4×4 antenna can be selected for the communication session. Similarly, if the network load is high, then multiple DUs can be activated by the telecommunication network to work together and provide necessary processing power.

20 Claims, 5 Drawing Sheets

(58) Field of Classification Search
CPC ............. H04W 28/0268; H04W 72/21; H04W 72/1263; H04W 72/51; H04W 72/04; H04W 72/29; H04W 28/0967; H04W 28/215; H04W 88/00
USPC .................................................. 370/235, 329
See application file for complete search history.

(56) References Cited

U.S. PATENT DOCUMENTS

| | | | |
|---|---|---|---|
| 11,233,691 B2 | 1/2022 | Grayson | |
| 11,496,943 B2* | 11/2022 | Raghothaman | ....... H04W 72/04 |
| 11,510,208 B2* | 11/2022 | Lekutai | ................. H04W 76/15 |
| 11,516,722 B2* | 11/2022 | Raghothaman | ....... H04L 5/0048 |
| 2020/0371576 A1 | 11/2020 | Tsirkin | |
| 2021/0045011 A1 | 2/2021 | Mishra et al. | |
| 2021/0045193 A1 | 2/2021 | Mishra et al. | |
| 2021/0092647 A1 | 3/2021 | Yang et al. | |
| 2021/0176823 A1 | 6/2021 | Mishra et al. | |
| 2021/0258969 A1 | 8/2021 | Yang et al. | |
| 2021/0368514 A1 | 11/2021 | Xing | |
| 2021/0368529 A1 | 11/2021 | Sakhnini et al. | |
| 2022/0038902 A1 | 2/2022 | Mueck | |
| 2022/0116799 A1 | 4/2022 | Wang et al. | |
| 2022/0167187 A1 | 5/2022 | Jia et al. | |
| 2022/0217704 A1* | 7/2022 | Lekutai | ................. H04W 76/15 |
| 2022/0369163 A1* | 11/2022 | Gundavelli | ....... H04W 28/0268 |
| 2022/0369404 A1* | 11/2022 | Gundavelli | ........... H04W 76/15 |
| 2022/0417097 A1* | 12/2022 | Nakata | ..................... H04L 43/12 |
| 2022/0417794 A1* | 12/2022 | Bogineni | .......... H04W 28/0967 |
| 2023/0007664 A1* | 1/2023 | Ravuri | .............. H04W 72/1263 |
| 2023/0069921 A1* | 3/2023 | Lekutai | ................. H04W 72/51 |
| 2023/0087665 A1* | 3/2023 | Prakash | ................ H04W 88/00 370/235 |
| 2023/0112049 A1* | 4/2023 | Hu | ......................... H04W 72/29 370/329 |
| 2023/0388844 A1* | 11/2023 | Dent | ................. H04W 28/0215 |

OTHER PUBLICATIONS

Adamuz-Hinojosa et al., "Sharing gN8 components in RAN slicing: A perspective from 3GPP/NFV standards," 2019 IEEE Conference on Standards for Communications and Networking (CSCN), Oct. 2019, pp. 1-7, doi:10.1109/CSCN.2019.8931318. (Year: 2019), 7 pages.

Bonati et al, "Intelligence and Learning in 0-RAN for Data-Driven NextG Cellular u Networks," in IEEE Communications Magazine, vol. 59, No. 10, pp. 21-27, Oct. 2021, doi: 10.1109/MCOM.101. 2001120. (Year:2021), 7 pages.

Dryjanski, Marcin, "5G Core Network Functions", available at <<https://www.grandmetric.com/2018/03/02/5g-core-network-functions/>>, Feb. 3, 2018, 13 pages.

Jordan, Eugina, "Open RAN 101-RU, DU, CU: Why, what, how, when?", available at <<https://www.rcrwireless.com/20200708/open_ran/open-ran-101-ru-du-cu-reader-forum>>, Jul. 8, 2020, 8 pages.

Office Action for U.S. Appl. No. 17/143,990, mailed on Mar. 18, 2022, Lekutai, "Selection of Open Radio Access Network (RAN) Components", 16 pages.

* cited by examiner

SELECTION OF OPEN RADIO ACCESS NETWORK (RAN) COMPONENTS

CROSS REFERENCE TO RELATED APPLICATION

This application is a continuation of and claims priority to commonly assigned, co-pending U.S. patent application Ser. No. 17/143,990, filed Jan. 7, 2021. Application Ser. No. 17/143,990 is fully incorporated herein by reference.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques and systems relating to selecting open radio access network (RAN) components. In a traditional Radio Access Network (RAN), hardware components and software code are tightly coupled, and interfaces do not support interoperability between different vendors. Using techniques described herein, RAN components from different vendors such as Radio Units (RUs), Centralized Units (CUs), and Distributed Units (DUs) in an open RAN may be automatically selected to be used during a communication session.

Generally, RUs perform operations (e.g., transmitting, receiving, amplifying, digitizing, . . . ) for radio frequency signal. RUs are typically located near, or integrated into, the antenna. The DU and CU are the computation parts of the base station. The DU is physically located at/near the RU and the CU can be located at some other location (e.g. nearer to the core network). A DU may be configured to run the radio link control (RLC), medium access control (MAC), and parts of the physical (PHY) layer. The CU typically runs the radio resource control (RRC) and packet data convergence protocol (PDCP) layers.

Using techniques described herein, hardware/software of a telecommunication network automatically selects one or more RUs, DUs, and CUs (which may come from different vendors) to use for a communication session with a user equipment (UE). In some examples, an application on the UE specifies the desired performance (e.g., bandwidth requirements, processing requirements, latency requirements, . . . ) For example, if an application requests a large throughput of data, a massive multiple-input and multiple-output (mMIMO) RU can be selected for use, whereas if a moderate throughput is specified, then a traditional 4×4 antenna can be selected for the communication session. As another example, if the UE is near a base station, a Time Division Duplexing (TDD) RU can be selected to provide best performance, whereas if the UE is at cell edge, then a Frequency Division Duplexing (FDD) RU might be selected. Similarly, if the network load is high, then multiple DUs can be activated by the telecommunication network to work together and provide necessary processing power.

The systems, devices, and techniques described herein can improve a functioning of a network by providing an architecture to select RAN components to optimize network resources and performance. By allowing the selection of multiple components from different vendors, network operators can select the best RUs, DUs, and CUs to run specific applications or network scenarios instead of having to use particular network components. Together with machine learning/big data/analytics, an optimized combination of radio components can be selected to optimize network resources and performance, preserve energy, and provide an improved user experience during communication sessions. More details are provided below with reference to FIGS. 1-5.

Figure 1:
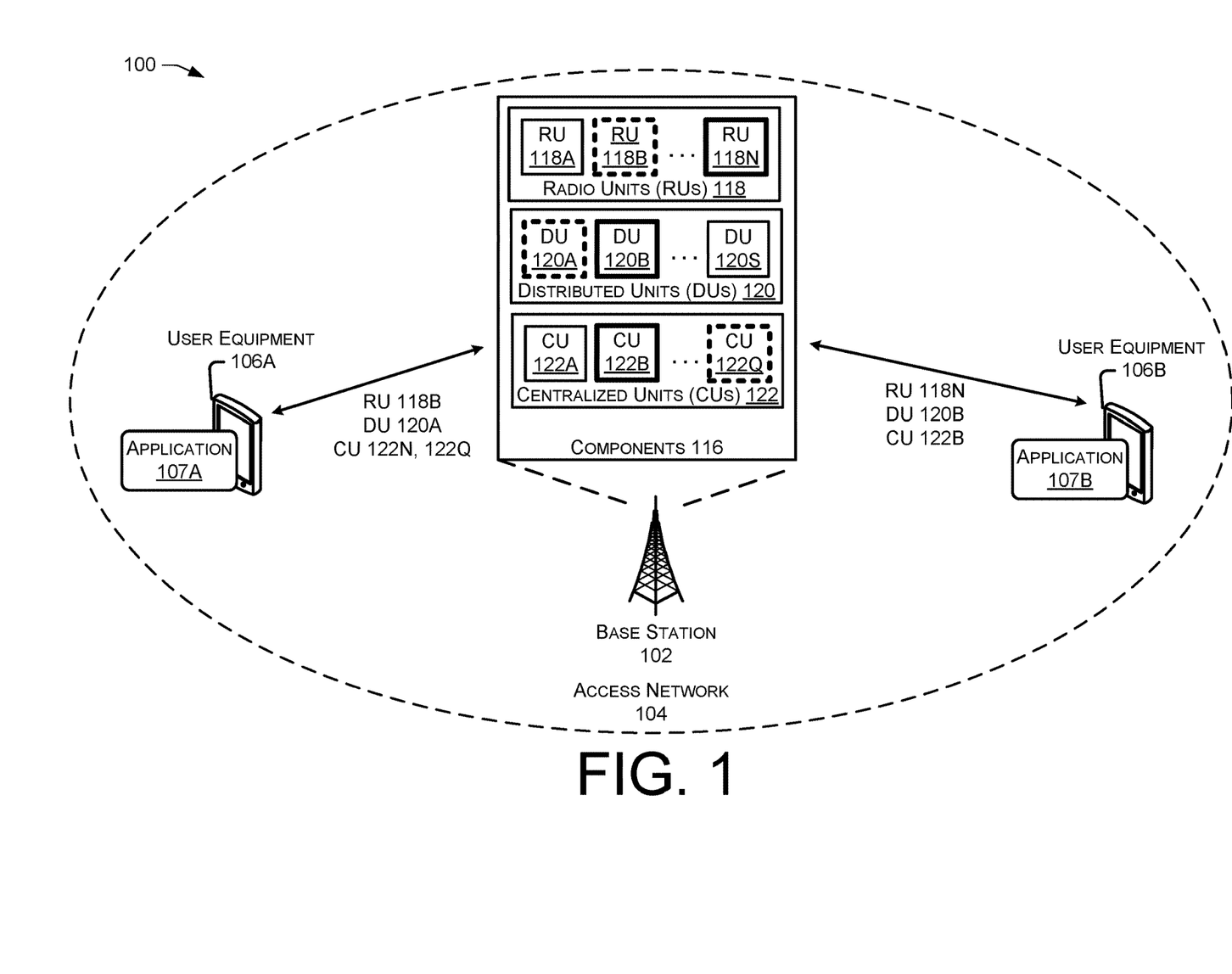
FIG. 1 is a block diagram of an illustrative environment showing selection of open radio access network (RAN) components from different vendors.

FIG. 1 is a block diagram of an illustrative environment 100 showing selection of open radio access network (RAN) components 116 from different vendors. In the network environment 100, a base station 102 can communicate with any of a variety of devices, such as a user equipment (UE) 106, in an open RAN network, such as access network 104.

In various examples, the base station 102 may include different radio units (RUs) 118, distributed units (DUs) 120, and centralized units (CUs) 122. In other examples, some of the components 116, such as the CUs 122 may be located at other locations within the access network 120 and/or within the core network, such as the 5G core network 210 illustrated in FIG. 2. The base station 102 includes components configured to transmit communications over the wireless resources to devices located in the access network (e.g., the UE 106), and to receive communications over the wireless resources from the devices located in the access network 104.

Figure 2:
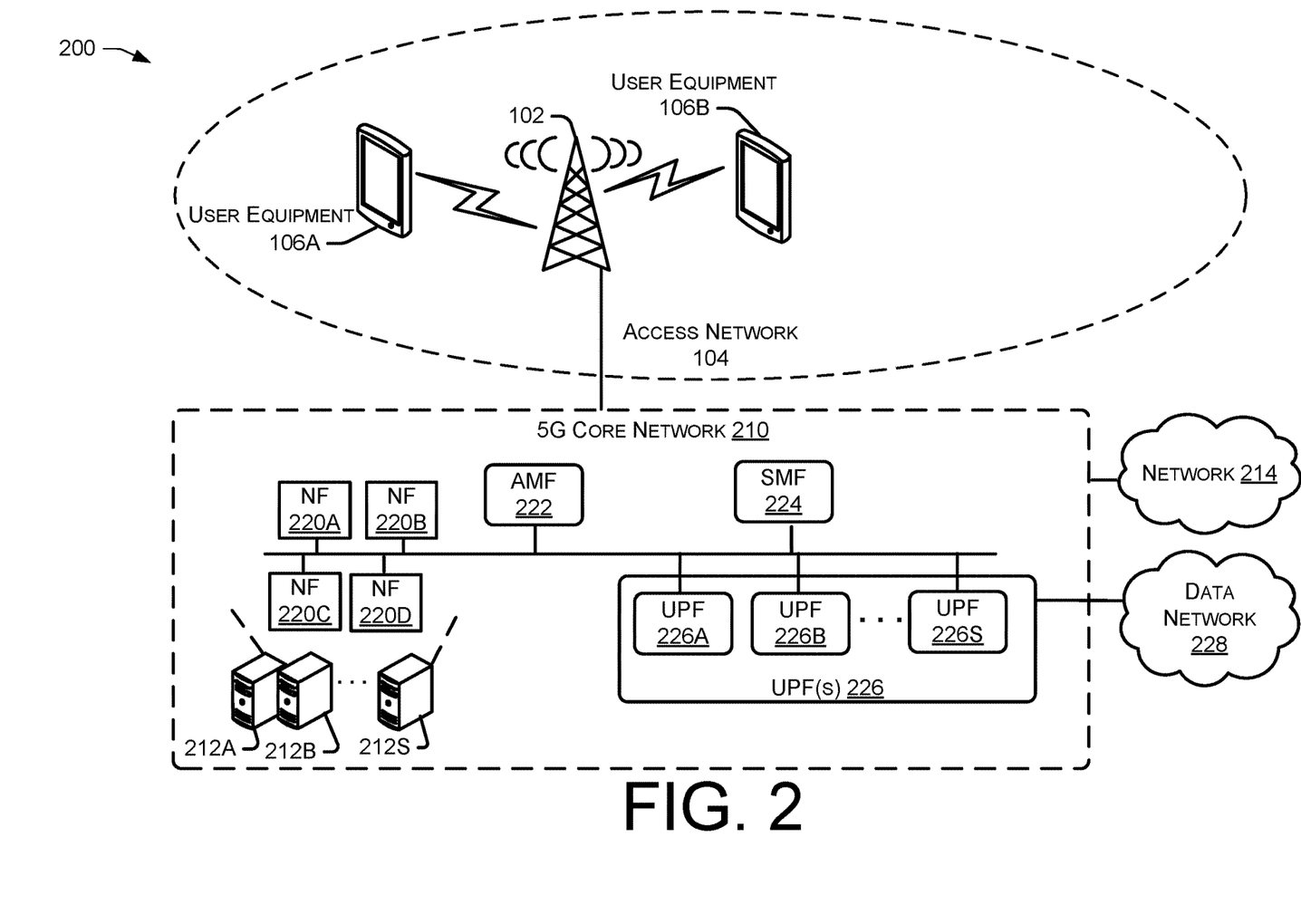
FIG. 2 is a block diagram of an illustrative environment including a fifth generation (5G) core network showing selection of RAN components.

Although not illustrated in FIG. 1, in some instances, the base station 102 may relay communications between an external network (e.g., a core network as illustrated in FIG. 2) and the devices located in the access network 104. A core network, for example, can provide services to device(s) via the base station 102 from a wide area network (WAN), such as the Internet. In some instances, the core network includes an IP Multimedia Subsystem (IMS) core (sometimes referred to as an "IMS core network," an "IMS network," or an "IM CN Subsystem").

In some instances, the base station 102 can utilize wireless resources specified in the 5G New Radio (NR) standard, as defined by 3GPP. In certain implementations, the base station 102 can transmit and receive communications over frequency bands including, but not limited frequency ranges associated with Long Term Evolution (LTE), 5G networks (e.g., frequency range 1 (FR1) that ranges from 450 MHz to 6 GHz, and frequency range 2 (FR2) that ranges from 24.25 GHz to 52.6 GHz), as well as other frequency ranges).

In addition, the base station 102 may utilize other types of wireless resources and RUs 118. For example, the base station 102 may utilize a wireless band including frequency resources in at least one of a Citizens Broadband Radio Service (CBRS) band (e.g., a 3550-3700 MHz band), a Long Term Evolution (LTE) Band 71 (e.g., a 600 MHz band), an LTE Band 48 (e.g., 3500 MHz), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). Although referred to in the context of LTE bands, it can be understood that the base station may utilize the frequency resources discussed herein in the context of any 5G embodiments, such as n71 or n77 (C-Band).

In some embodiments, the base station 102 is part of a Non-Standalone (NSA) architecture and/or a Standalone (SA) architecture. In an NSA architecture, the base station 102 may be coordinated with an LTE base station, and/or may relay services between devices in the access network 104 and an LTE core network (e.g., an Evolved Packet Core (EPC)). In an SA architecture, the base station 102 may relay services between devices in the access network 104 and a 5G core network (5GC).

The access network 104 may be a geographic region in which the base station 102 can transmit and/or receive wireless communications. The access network 104 may be divided into different regions (not shown), which may be defined according to a distance from the base station 102, a quality of wireless communications with the base station 102, sources of attenuation in the access network 104, etc. For example, the access network 104 may include a near-cell region, a mid-cell region, and a cell edge region. In some instances, the near-cell region is less than a threshold distance from the base station 102 and is a region where wireless communication with the base station 102 is relatively strong. The mid-cell region is equal to or larger than the threshold distance In certain instances, the cell edge region is more than a threshold distance from the base station 102 and is a region where wireless communication with the base station 102 and has an outer boundary that is defined by the cell edge 112 outer boundary of the access network 104. In some instances, the mid-cell region is a region where wireless communication with the base station 102 is weaker than in the near-cell region.

The base station 102, or some other device or component, may determine whether devices are located in the near-cell region, the mid-cell region, or past the cell edge region based on a quality and/or power of transmissions between the base station 102 and the devices. For instance, the base station 102 may determine that the UE 106 is located in the near-cell region by receiving a signal from the UE 106 and determining that a quality or power of the received signal is greater than a particular threshold. The base station 102 may determine that a UE 106 is located in the mid-cell region by receiving a signal from the UE 106 and determining that a quality or power of the received signal is less than or equal to the particular threshold.

The UE 106 is configured to transmit and/or receive wireless communications with the base station 102 and may be located in the access network 104. The UE 106 may be capable of supporting NR communications. For example, the UE 106 may be configured to support at least one of enhanced Mobile Broadband (eMBB) communications, Ultra Reliable Low Latency Communications (URLLCs), or massive Machine Type Communications (mMTCs). In some instances, the UE 106 and/or the second UE 106 support one or more of a sensor network, voice services, smart city cameras, gigabytes-in-a-second communications, 3D video, 4K screens, work & play in the cloud, augmented reality, industrial and/or vehicular automation, mission critical broadband, or a self-driving car.

The UE 106 may be capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future IP-based network technology or evolution of an existing IP-based network technology.

Examples of the UE 108 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UE 106 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a wireless network.

The base station 102 may be configured to transmit first downlink data to the UE 106. As used herein, the term "downlink," and its equivalents, refers to a transmission direction defined from a base station to an end-user device. As used herein, the term "uplink," and its equivalents, refers to a transmission defined from the end-user device to the base station. The base station 102 may utilize multiple channels for downlink transmissions within the access network 104. As used herein, the terms "channel," "frequency channel," "frequency resource," "carrier frequency," or their equivalents, may refer to a distinct range of electromagnetic frequencies or spectrum by which data can be transmitted wirelessly from one device to at least one other device. A "band" may refer to a range of frequencies including multiple channels that are adjacent in the frequency spectrum. In some examples, a frequency channel is defined according to a single frequency. For instance, the data is transmitted by modulating a "carrier," which is an electromagnetic wave that has a frequency defined within a particular frequency channel. The base station 102 may utilize various channels in the radio spectrum. In particular, the base station 102 may be allocated, or otherwise utilize, multiple channels for downlink transmission within the access network 104.

In various implementations, the base station 102 may select and use different RUs 118 for communication with UE 106. As illustrated, the RUs 118 include RUs that have different capabilities. The RUs may also come from different vendors. As an example, RU 118A might be a 4×4 antenna available from vendor 1, RU 118B might be mMIMO available from a different vendor, RU 118N might be a TDD RU, and the like. The components 116 may also include DUs 120, and CUs 122.

As illustrated, hardware/software of a telecommunication network, such as base station 102, automatically selects one or more RUs 118, DUs 120, and CUs 122 (which may come from different vendors) to use for a communication session with a UE 106. As briefly discussed, in some examples, an application 107A on the UE 106A and the application 107B on the UE 106B specifies the desired performance (e.g., bandwidth requirements, processing requirements, latency requirements, . . . ). Some example applications 107 include, but are not limited to browser applications, messaging applications, voice applications (e.g., Voice over Internet Protocol "VoIP" applications), video applications, game applications, and the like.

As an example, application 107A specifies/provides first performance parameters that identify a desired performance of application 107A and application 107B specifies/provides second performance parameters that identify a desired performance of application 107B. In response to identifying the desired performance of an application 107, the base station 102 may select the RUs 118, DUs 120, and CUs 122 for use during a communication session with the UE. In the current example, RU 118A, DU 120A, and CUs 122N and 122Q have been selected for use for application 107A. RU 118N, DU 120B, and CU 122B have been selected for use for application 107B. The components 118 may be selected based on the requested performance of an application, availability of components 116, current network conditions, forecasted network conditions, and the like. As discussed above, the RUs 118 might include MIMOs, mMIMOs, 4×4 antennas, TDD, FDD, and the like.

In some cases, the components 116 selected for use may also be selected based on network conditions, the location of the UE 106 within the access network 104, and/or other factors. The distance between the base station 102 and the first UE 106 may impact the reliability of data transmitted over different channels. For example, higher-frequency signals are attenuated by the air and obstructions to a greater extent than lower-frequency signals, such as signals transmitted over LTE bands. In some configurations, when the UE 106 is within a near-cell region, an RU 118 that operates at a higher frequency compared to one of the other RUs 118 may be selected.

In some cases, the components 116 selected for use may also be selected based on network interference into other systems such as Fixed Satellite Services (FSS) or altimeter of an airplane (in C-Band spectrum). In other examples, a 4×4 RU 118A with stringent out of band (OOB) filtering can be chosen over mMIMO RU 118B with insufficient OOB limit; or mMIMO RU 118C with beam-nulling pattern over mMIMO RU 118B with regular beam-forming pattern. Vice-versa, the components 116 may be selected based on interference from other systems into the access network 104

In some configurations, the base station 102, the UE 106, or some other device/component may determine current/ forecasted congestion levels of the network. As used herein, the terms "congestion level," "utilization level," and their equivalents, can refer to an amount of a wireless resource being used to transfer data between devices. For example, the congestion level of a wireless channel can refer to an amount (e.g., a percentage) of scheduled slots within the wireless channel. In various cases, the components 116, such as the selected RU(s) 118 may be changed based on changing conditions of the UE 106 and/or network. For instance, if the congestion level of a particular frequency range associated with a RU 118 exceeds a threshold or is predicted to exceed the threshold, a different RU 118 may be selected.

In some examples, artificial intelligence (AI) may be used in selecting the components 116. For instance, the base station 102 may use a computing model to predict conditions of the network, requirements of application(s) 107 being used or to be used by a UE 106, and select the components based on the predicted conditions. The base station 102 may use a computing model, such as a machine learning model, to identify trends in the congestion levels. As used herein, the term "machine learning model" can refer to any computing model that is built or otherwise optimized based on training data. The machine learning model, for example, may be configured to identify features that are indicative of data traffic and/or spectrum trends based on training data indicating previous data traffic metrics associated with the base station 102. The machine learning model may be supervised, unsupervised, or a combination of both. Examples of the machine learning model include at least one of a decision tree, a support vector machine, a regression model (e.g., a logistic regression model), a Bayesian network, or any other type of machine learning model known in the art. Once trained, the machine learning model may be configured to intelligently the components 116 for the UE 106.

FIG. 2 is a block diagram of an illustrative environment including a 5G core network showing selection of RAN components. The environment 200 may include an access network 104, a 5G core network 210, a network 214, and a data network 228 that is associated with a wireless service provider(s). The environment 200 is illustrated in simplified form and may include many more components.

The environment 200 may include one or more base stations 102 that may be wireless or wired that are coupled to 5G core network 110 and/or some other network. The environment 100 may also include one or more access points (not shown), and one or more gateways (not shown). A base station 102 may handle traffic and signals between electronic devices, such as the user equipment 106, and 5G CN 210. For example, a base station 102 may include components 116 from different vendors to perform the transcoding of speech channels, allocation of radio channels to electronic devices, paging, transmission and reception of voice and data, as well as other functions. While one base station is illustrated, more than one base station 102 may be included within access network 104. Each base station 102 may include transceivers, antennas, and additional network switch and control equipment that provide a network cell for facilitating wireless communication between UE computing devices and the core network 210 and/or other networks.

The UE 106 are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a cellular access network 104, and/or over a Wi-Fi network, or some other type of network. In some instances, the UE 106 computing devices can be configured to send and receive data using any wired or wireless protocols. Additional examples of the UE 106 include, but are not limited to, smart devices such as televisions, music players, or any other electronic appliances that can generate, request, receive, transmit, or exchange voice, video, and/or digital data over a network. In some examples, the UE 106 is configured to communicate with 5G CN 210, and/or other cellular networks. The UE 106 can further be configured to establish or receive a communication session, such as a voice call, a video call, or another sort of communication.

In some configurations, one or more nodes, such as nodes 212 illustrated in 5G CN 210 and/or nodes (not illustrated) in network 214 may be configured as one or more application servers that provide support for one more applications, such as application 107 used by one or more computing devices, such as UE 106. Some example applications include, but are not limited to browser applications, messaging applications, voice applications (e.g., Voice over Internet Protocol "VoIP" applications), video applications, and the like.

While the nodes 212 are illustrated within the 5G CN 210, one or more other computing devices may be located outside of these networks. For example, an application server, or some other server or device, may be connected to a network via one or more external packet switched networks, such as the Internet.

According to some configurations, a telephony client application on the UE 106 may establish data communication with the network 210 through a data connection to the base station 102. The base station 102 may route a communication wired/wirelessly from the UE 106 through the access network 104 for communication to the 5G CN 210. In general, a base station 102 can be implemented as a variety of technologies to provide wired and/or wireless access to the network, as discussed herein. In some instances, the base station 102 can include a New Radio (5G) RAN, a 3GPP RAN, such a GSM/EDGE RAN (GERAN), a Universal Terrestrial RAN (UTRAN), an evolved UTRAN (E-UTRAN), or alternatively, a "non-3GPP" RAN, such as a Wi-Fi RAN, or another type of wireless local area network (WLAN) that is based on the IEEE 802.11 standards. Further, the base station 102 can include any number and type of transceivers and/or base stations representing any number and type of macrocells, microcells, picocells, or femtocells, for example, with any type or amount of overlapping coverage or mutually exclusive coverage.

When a communication request arrives at the network 210, one or more of the nodes 212 may determine the identity of the originating computing device for the communication (e.g., using a telephone number, IMEI, IMSI, IP address) as well as the identity of the computing devices to send the communication. In some configurations, one or more of the nodes 212 may be used to determine the identity of the originating computing device for the communication as well as the identity of the computing devices to send the communication. According to some configurations, a UE 106 may connect to the service nodes 212, or some other component such as an application server, via the Internet (not illustrated).

As illustrated, the environment 200 includes one or more servers, including nodes 212, to facilitate communications by and between the various devices in the environment 200 and perform operations relating to using the network 214, the data network 228, and/or other networks. That is, environment 200 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 200 may implement GSM, UMTS, LTE/LTE Advanced, and/or 5G NR telecommunications technologies.

The environment 200 may include, but is not limited to, a combination of: base transceiver stations BTSs (e.g., NodeBs, Enhanced-NodeBs, gNodeBs), Radio network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 106, and one or more endpoints within the environment 200 (e.g., nodes 212A-212S that provide network functions (NFs) 220A-220D, Access and Mobility Management Function (AMF) 222, Session Management Function (SMF) 224, user-plane functions (UPFs) 226, websites, etc.). While FIG. 2 illustrates an example environment 200, it is understood in the context of this document, that the techniques discussed herein may also be implemented in other networking technologies.

The 5G core network 210 may expose network Functions (NFs) to nodes within the network 210, and/or nodes within some other network, such as network 214 and/or network 228. As illustrated, the 5G CN exposes NFs 220A-220D, AMF 222, SMF 224, and UPFs 226.

In some examples, the UE 106 requests a new session that is received by an AMF 222. The AMF 222 receives the request from the UE 106 and handles connection or mobility management requests while forwarding session management requirements to the SMF 224. The AMF 222 may determine which SMF 224 to use by querying a Network Repository Function (NRF. According to some configurations, the SMF 224 may access and/or store data that identifies the connected cell-IDs associated with UEs and the corresponding connected UPFs.

As briefly discussed above, using techniques described herein, a UE 106 is not limited to components 116 from a specific vendor for a communication session. For example, a UE 106 can be configured to use a first set of components 116 for a first communication session and select different components 116 for use during a different communication session.

While the UE 106 is connected to a base station 102, the base station 102 may be receiving various types of data that is relevant in determining which components 116 to use. For example, the UE 106 may generate performance metrics associated with a current state of service being provided by the network operator and/or signal qualities associated with the base station 102 and/or one or more other base stations. As a more specific, but non-limiting example, the performance metrics may indicate that a signal strength of a currently used RU 118 is relatively weak at the UE 106 and that other RUs may provide better performance for the UE 106. The metrics may include standard Received Signal Received Power (RSRP) measurements that are generated for use in base station selection, reselection, and handover triggering. In various embodiments, the performance metrics may also discretely indicate with respect to one or more base stations a Signal-to-Noise Ratio (SNR), a Signal-to-Interference Plus Noise Ratio (SINR), a Signal-to-Noise Plus Distortion Ratio (SNDR), or any combination thereof. In some examples, the UE 106 may calculate a channel quality indicator (CQI) for inclusion within the metrics. For example, a CQI may be calculated using any relevant factors such as, for example, RSRP, SNR, SINR, SNDR, or any combination thereof. In addition to receiving metrics from the UE 106, the base station 102 and/or some other device or component, may also be receiving/accessing/generating other data such as current capacity data associated with an available capacity of various base stations.

In some embodiments, the determination of which components to use may be based on a current demand for data from the UE 106. For example, a user of the UE 106 may need access to streaming video content. Accordingly, during use of a streaming video content application, the data demand from the UE 106 may increase sharply as the user begins to stream video content. Therefore, the increased demand for data may factor into what components 116 to select to use.

Figure 3:
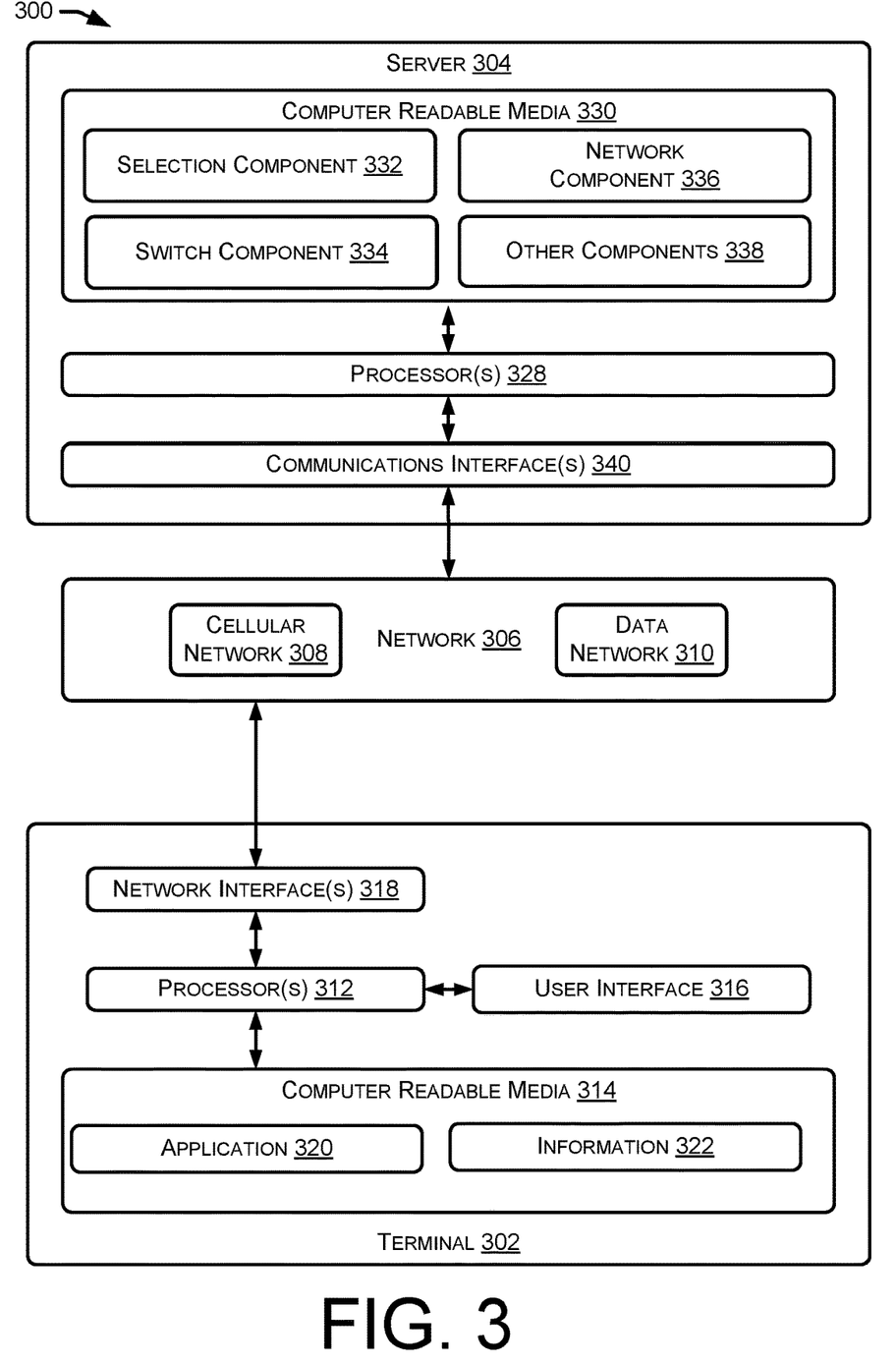
FIG. 3 is a block diagram illustrating a system that includes one or more components for selecting RAN components.

FIG. 3 is a block diagram illustrating a system 300 that includes one or more components for selecting RAN components. The system 300 includes a terminal 302, which can represent a UE 106, or another computing device, coupled to a server 304, via a network 306. The server 304 can represent a computing device, such as one or more of the servers within the access network 202, the 5G CN 210, network 214, and/or some other computing device. The network 306 can represent network 210, 214, 228 and/or access network 202, or some other network.

The network 306 can include one or more networks, such as a cellular network 308 and a data network 310. The network 306 can include one or more core network(s) connected to terminal(s) via one or more access network(s). Example access networks include LTE, WIFI, GSM Enhanced Data Rates for GSM Evolution (EDGE) Radio Access network (GERAN), UTRAN, and other cellular access networks. Message transmission, reception, fallback, and deduplication as described herein can be performed, e.g., via 3G, 4G, 5G, WIFI, or other networks.

The cellular network 308 can provide wide-area wireless coverage using a technology such as GSM, Code Division Multiple Access (CDMA), UMTS, LTE, NR, or the like. Example networks include Time Division Multiple Access (TDMA), Evolution-Data Optimized (EVDO), Advanced LTE (LTE+), Generic Access network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 404 and terminals such as the terminal 302 can additionally or alternatively be performed using other technologies, such as wired (Plain Old Telephone Service, POTS, or PSTN lines), optical (e.g., Synchronous Optical NETwork, SONET) technologies, and the like.

The data network 310 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 304 includes or is communicatively connected with an IWF or other device bridging networks, e.g., LTE, 3G, and POTS networks. In some examples, the server 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using VoIP or other technologies as well as data traffic, or the cellular network 308 can carry data packets using HSPA, LTE, or other technologies as well as voice traffic. Some cellular networks 308 carry both data and voice in a PS format. For example, many LTE networks carry voice traffic in data packets according to the VoLTE standard. Various examples herein provide origination and termination of, e.g., carrier-grade voice calls on, e.g., networks 306 using CS transports or mixed VoLTE/5G transports, or on terminals 302 including OEM handsets and non-OEM handsets.

The terminal 302 can be or include a wireless phone, a wired phone, a tablet computer, a laptop computer, a wristwatch, or other type of terminal. The terminal 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 314, such as memory (e.g., random access memory (RAM), solid state drives (SSDs), or the like), disk drives (e.g., platter-based hard drives), another type of computer-readable media, or any combination thereof. The CRM or other memory of terminal 302 can hold a datastore, e.g., an SQL or NoSQL database, a graph database, a BLOB, or another collection of data. The terminal 302 can further include a user interface (UI) 316, e.g., including an electronic display device, a speaker, a vibration unit, a touchscreen, or other devices for presenting information to a user and receiving commands from the user. The terminal 302 can further include one or more network interface(s) 318 configured to selectively communicate (wired or wirelessly) via the network 306, e.g., via an access network 102.

The CRM 314 can be used to store data and to store instructions that are executable by the processors 312 to perform various functions as described herein. The CRM 314 can store various types of instructions and data, such as an operating system, device drivers, etc. The processor-executable instructions can be executed by the processors 312 to perform the various functions described herein.

The CRM 314 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program components, or other data.

The CRM 314 can include processor-executable instructions of an application 320. The CRM 314 can store information 322 identifying the terminal 302. The information 322 can include, e.g., an IMEI, an IMSI identifying the subscriber using terminal 302, or other information discussed above. The CRM 314 can additionally or alternatively store credentials (omitted for brevity) used for access, e.g., to IMS or RCS services.

The server 304 can include one or more processors 328 and one or more CRM 330. The CRM 330 can be used to store processor-executable instructions of a selection component 332 which may be configured to dynamically select components 116 to use during a communication session based, at least in part, on the application 107 being used, and/or one or more network conditions. The switch component 334 may be configured to switch from first components 116 to second components 116, a network component 336 may be configured to perform one or more network operations, as well as one or more other components 338. The processor-executable instructions can be executed by the one or more processors 328 to perform various functions described herein.

In some examples, server 304 can communicate with (e.g., is communicatively connectable with) terminal 302 or other devices via one or more communications interface(s) 340, e.g., network transceivers for wired or wireless networks, or memory interfaces. Example communications interface(s) 340 can include ETHERNET or FIBRE CHANNEL transceivers, WIFI radios, or DDR memory-bus controllers (e.g., for DMA transfers to a network card installed in a physical server 304).

In some examples, processor 312 and, if required, CRM 314, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 328 and, if required, CRM 330.

Figure 4:
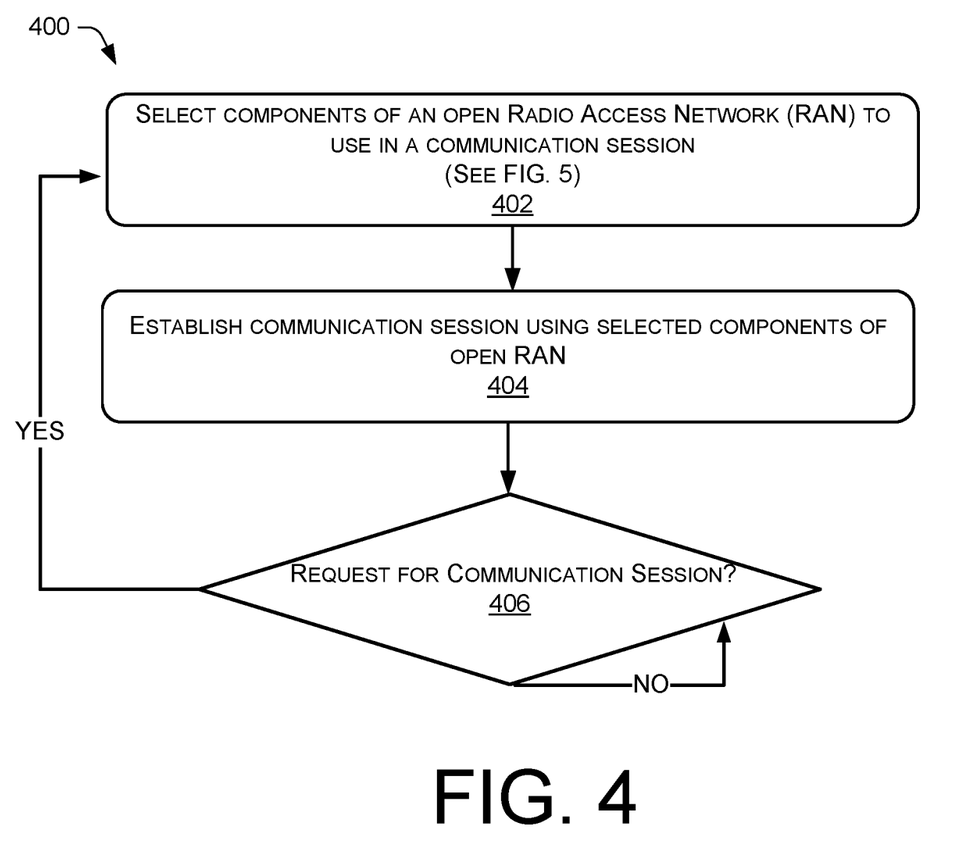
FIG. 4 is a flow diagram of an example process that includes selecting RAN components used by a user equipment (UE) in cellular networks.
Figure 5:
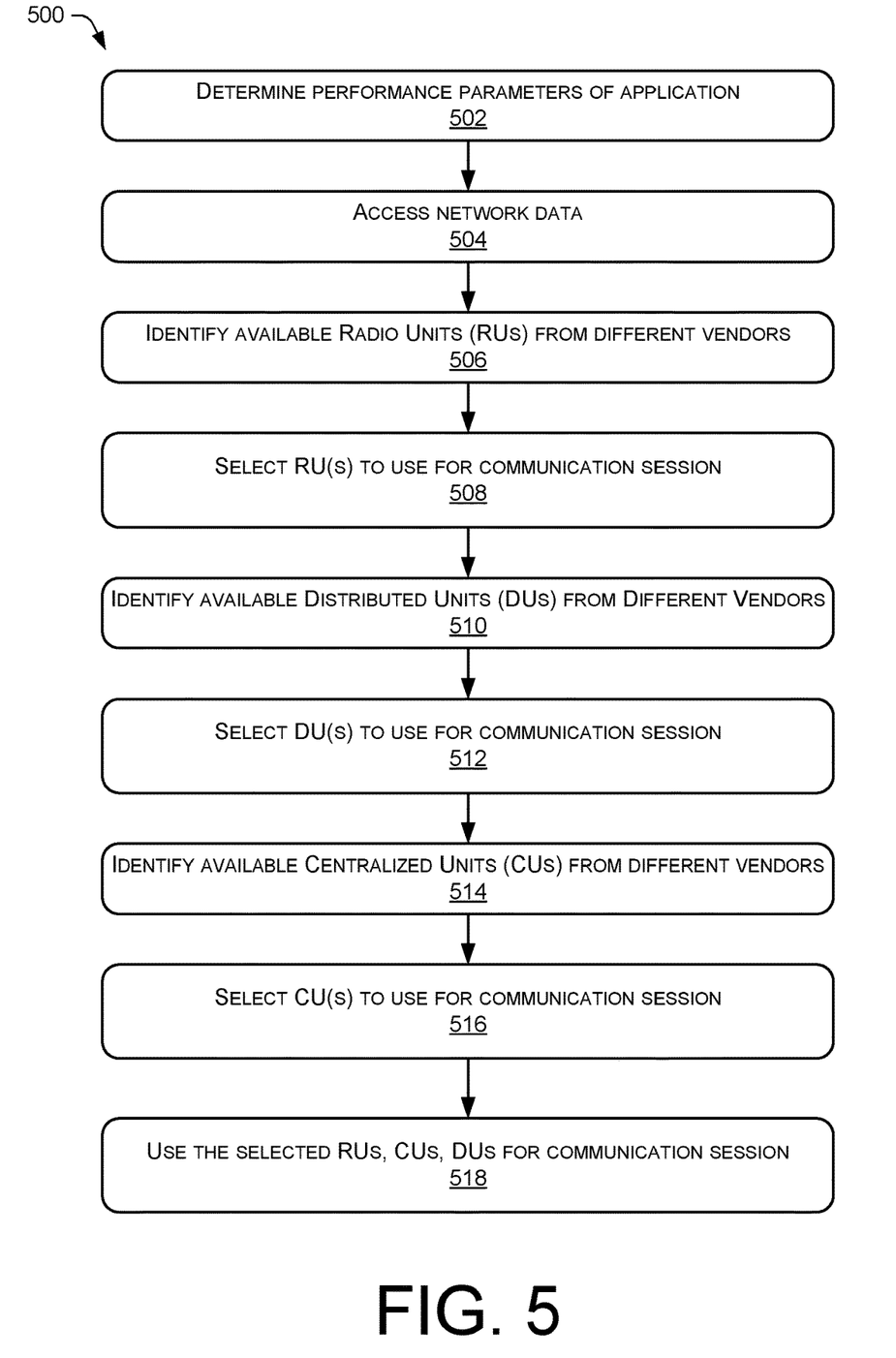
FIG. 5 is a flow diagram of an example process that includes selecting different RAN components including radio units, distributed units, and central units.

FIGS. 4-5 illustrate example processes. The example processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 is a flow diagram of an example process that includes selecting RAN components used by a UE in cellular networks. The process includes, at 402, selecting components 116 of an open RAN to use during a communication session. As discussed above, and in more detail with regard to FIG. 5, the selection of components 116, such as RUs 118, DUs 120, and CUs 122 may be selected based on application performance parameters, current/forecasted network conditions, location of the UE 106, and the like.

At 404, a communication session is established with the UE 106 using the selected components. As discussed above, using techniques described herein, the components used come from different vendors.

At 406, a determination is made as to whether another communication session is requested. As discussed above, in some examples, an application 107, and/or some other device/component, may request a different communication session to be established. When there is a request for a communication session, the process 400 returns to 402 where components may be selected. When there is not a request for a communication session, the process 400 returns to processing other actions.

FIG. 5 is a flow diagram of an example process that includes selecting different RAN components 116 including radio units 118, distributed units 120, and central units 122. The process includes, at 502, determining performance parameters of an application 107 requesting a communication session. As discussed above, the request may come from the application 107 executing on the UE 106. The application 107 may be many different types of applications that have different performance requirements. For example, a video streaming application may request a bandwidth to support streaming video content, whereas a sensor application may request low latency. Other applications may request/specify other desired performance parameters (e.g, processing, latency, bandwidth, . . . ).

At 504, network data may be accessed. As discussed above, the network performance data may include information that relates to the current/forecasted performance of the network. In some examples, the network data may indicate that the UE 106 is near cell, mid-cell, or near a cell edge. In some cases, the UE 106 monitors specified network conditions and can provide power headroom reports (PHRs) to one or more nodes associated with access network 104. According to some configurations, other network data may also be used to assist in determining what components to use. For example, the available bandwidth, current usage statistics, forecasted usage statistics, and/or some other data may be used to determine what components to select to provide service at a desired level to the UE 106.

At 506, available RUs 118 are identified. As discussed above, a node or component, may identify the RUs that are available to provide RU functionality for the application 107 for UE 106. In some examples, the RUs may come from different vendors.

At 508, the RU 118 to use for the communication session with the UE 106 is selected based, at least in part, on the application 107. An RU can be a simple 4×4 antenna, a massive MIMO antenna, or a TDD or FDD based antenna. As discussed above, if the application 107 requests a large throughput of data, an mMIMO RU will be selected, if a moderate throughput, then a traditional 4×4 antenna may be selected. If the UE 106 is near the base station 102 then a TDD RU can be selected, whereas if the UE 106 is at a cell edge, an FDD RU may be selected. In some examples, multiple RUs 118 which may be from different vendors may be selected for use.

At 510, available DUs 120 are identified. As discussed above, a node or component, may identify the DUs 120 that are available to provide DU functionality for the application 107 for UE 106. In some examples, the DUs may come from different vendors/manufacturers.

At 512, the DUs 120 to use for the communication session with the UE 106 is selected based, at least in part, on the application 107. As discussed above, if the application 107 requests a large amount of processing power, the network load is high, then multiple DUs can be activated to work together.

At 514, available CUs 122 are identified. As discussed above, a node or component, may identify the CUs 122 that are available to provide CU functionality for the application 107 for UE 106. In some examples, the CUs may come from different vendors.

At 516, the CUs 120 to use for the communication session with the UE 106 is selected based, at least in part, on the application 107.

At 518, the selected RUs 118, CUs 120, and DUs 122 are configured to be used during the communication session with the application 107 and the UE 106. Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A system comprising:
   one or more processors;
   a memory; and
   one or more components stored in the memory and executable by the one or more processors to perform operations comprising:
   selecting, based at least on one or more first parameters of a first application that indicate a desired performance of the first application, one or more first components of an open Radio Access Network (RAN) for use in a first communication session that involves the first application, wherein the one or more first components are selected from a plurality of Radio Units (RUs), Distributed Units (DUs), and Central Units (CUs);
   establishing the first communication session using the one or more first components of the open RAN;
   selecting, based at least on one or more second parameters of a second application that indicate a desired performance of the second application, one or more second components of the open RAN for use in a second communication session that involves the second application; and
   establishing the second communication session using the one or more second components of the open RAN.

2. The system of claim 1, wherein selecting the one or more first components comprises selecting a first RU from the RUs based at least in part on a first throughput of the first RU and wherein selecting the one or more second components comprises selecting a second RU from the RUs based at least in part on a second throughput of the second RU.

3. The system of claim 2, wherein selecting one or more of the first RU, a first DU, and a first CU is based at least in part on a proximity of a UE running the first application to a base station.

4. The system of claim 1, further comprising selecting a number of DUs to use for at least one of the first application and the second application based at least in part on a processing load associated with one or more of the first application and the second application.

5. The system of claim 1, further comprising determining a proximity of UE executing the first application to a base station and based at least in part on the proximity selecting a Time Division Duplexing (TDD) RU or a Frequency Division Duplexing (FDD) RU.

6. The system of claim 1, wherein selecting the one or more first components is further based on one or more of current usage statistics and forecasted usage statistics of the open RAN.

7. A computer-implemented method performed by one or more processors configured with specific instructions, the computer-implemented method comprising:
   selecting one or more first components of an open Radio Access Network (RAN) for use in a first communication session that involves a first application, wherein the one or more first components are selected from a plurality of Radio Units (RUs), Distributed Units (DUs), and Central Units (CUs);
   establishing the first communication session using the one or more first components of the open RAN;
   selecting one or more second components of the open RAN for use in a second communication session that involves a second application, wherein the one or more second components are selected from the plurality of RUs, DUs, and CUs; and
   establishing the second communication session using the one or more second components of the open RAN.

8. The computer-implemented method of claim 7, wherein selecting the one or more first components is based at least on part on one or more parameters of the first application that indicate a desired performance of the first application.

9. The computer-implemented method of claim 7, wherein selecting the one or more first components comprises selecting a first RU from the RUs based at least in part on a first throughput of the first RU and wherein selecting the one or more second components comprises selecting a second RU from the RUs based at least in part on a second throughput of the second RU.

10. The computer-implemented method of claim 9, wherein selecting one or more of the first RU, a first DU, and a first CU is based at least in part on a proximity of a UE running the first application to a base station.

11. The computer-implemented method of claim 7, further comprising selecting a number of DUs to use for at least one of the first application and the second application based at least in part on a processing load associated with one or more of the first application and the second application.

12. The computer-implemented method of claim 7, further comprising determining a proximity of UE executing the first application to a base station and based at least in part on the proximity selecting a Time Division Duplexing (TDD) RU or a Frequency Division Duplexing (FDD) RU.

13. The computer-implemented method of claim 7, wherein selecting the one or more first components is further based on one or more of current usage statistics and forecasted usage statistics of the open RAN.

14. A non-transitory computer-readable media storing computer-executable instructions that, when executed, cause one or more processors of a computing device to perform acts comprising:
- selecting one or more first components of an open Radio Access Network (RAN) for use in a first communication session that involves a first application, wherein the one or more first components are selected from a plurality of Radio Units (RUs), Distributed Units (DUs), and Central Units (CUs);
- establishing the first communication session using the one or more first components of the open RAN;
- selecting one or more second components of the open RAN for use in a second communication session that involves a second application, wherein the one or more second components are selected from the plurality of RUs, DUs, and CUs; and
- establishing the second communication session using the one or more second components of the open RAN.

15. The non-transitory computer-readable media of claim 14, wherein selecting the one or more components is based at least on part on one or more parameters that indicate a desired performance of the first application.

16. The non-transitory computer-readable media of claim 14, wherein selecting the one or more first components comprises selecting a first RU from the RUs based at least in part on a first throughput of the first RU.

17. The non-transitory computer-readable media of claim 16, wherein selecting one or more of the first RU, a first DU, and a first CU is based at least in part on a proximity of a UE running the first application to a base station.

18. The non-transitory computer-readable media of claim 16, the acts further comprising selecting a number of DUs to use for the first application based at least in part on a processing load associated with one or more of the first application and the open RAN.

19. The non-transitory computer-readable media of claim 16, further comprising determining a proximity of UE executing the first application to a base station and based at least in part on the proximity selecting a Time Division Duplexing (TDD) RU or a Frequency Division Duplexing (FDD) RU.

20. The non-transitory computer-readable media of claim 14, wherein selecting the one or more first components is further based on one or more of current usage statistics and forecasted usage statistics of the open RAN.

* * * * *